US012349005B2

(12) United States Patent
Fotheringham et al.

(10) Patent No.: US 12,349,005 B2
(45) Date of Patent: *Jul. 1, 2025

(54) MULTIPLE ASPECTS OF COMMUNICATION IN A DIVERSE COMMUNICATION NETWORK

(71) Applicant: Kymeta Corporation, Redmond, WA (US)

(72) Inventors: David Fotheringham, Kirkland, WA (US); Tom Freeman, Edmonds, WA (US); Benjamin Posthuma, Snohomish, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,571

(22) Filed: Oct. 26, 2023

(65) Prior Publication Data
US 2024/0205746 A1 Jun. 20, 2024

Related U.S. Application Data

(63) Continuation of application No. 16/750,439, filed on Jan. 23, 2020, now Pat. No. 11,818,606.

(Continued)

(51) Int. Cl.
H04W 28/08 (2023.01)
H04L 45/243 (2022.01)
(Continued)

(52) U.S. Cl.
CPC ........... H04W 28/08 (2013.01); H04L 45/243 (2022.05); H04L 47/22 (2013.01); H04L 49/25 (2013.01);
(Continued)

(58) Field of Classification Search
CPC .................................................... H04W 28/08
See application file for complete search history.

(56) References Cited

U.S. PATENT DOCUMENTS 10,476,585 B1    11/2019  Torres et al.
11,818,606 B2 *  11/2023  Fotheringham ..... H04W 36/144
(Continued)

FOREIGN PATENT DOCUMENTS

EP    2392109 B1    12/2015
JP    3185721 B2     7/2001
(Continued)

OTHER PUBLICATIONS

Office Action received for Israel Patent Application No. 285058, mailed on Nov. 20, 2023, 6 pages of Original documents only.
International Preliminary Report on Patentability received for PCT Patent Application No. PCT/US2020/015081, mailed on Aug. 5, 2021, 9 pages.
(Continued)

Primary Examiner — Jason E Mattis
(74) Attorney, Agent, or Firm — Womble Bond Dickinson (US) LLP

(57) ABSTRACT

A multi-wide area network (WAN) incorporating both satellite-based communication networks and cellular networks (e.g., an LTE network) is disclosed. In one embodiment, the WAN is implemented with a communications framework comprising: an edge appliance comprising a satellite modem interconnect for coupling to a satellite modem external to the edge appliance, a cellular modem interconnect for coupling to a cellular modem external to the edge appliance, a switch coupled to the satellite and cellular modem interconnects, and a processing node coupled to the switch and comprising a router to switch traffic between the satellite modem interconnect and the cellular modem interconnect when the edge appliance communicates with a public data network using a (Continued)

satellite link or a terrestrial cellular link, respectively; and a connectivity platform configured for connection to the edge appliance, the connectivity platform comprising a broker/integrator component configured to operate as a broker and an integrator between the edge appliance and both connectivity service providers and business support systems that perform subscription management to enable the edge appliance access to the satellite and terrestrial cellular links.

20 Claims, 15 Drawing Sheets

Related U.S. Application Data

(60) Provisional application No. 62/796,443, filed on Jan. 24, 2019.

(51) Int. Cl.
  *H04L 47/22* (2022.01)
  *H04L 49/25* (2022.01)
  *H04L 69/18* (2022.01)
  *H04W 12/08* (2021.01)
  *H04W 36/14* (2009.01)
  *H04W 36/30* (2009.01)
  *H04W 36/32* (2009.01)
  *H04L 67/10* (2022.01)

(52) U.S. Cl.
  CPC ............ *H04L 69/18* (2013.01); *H04W 12/08* (2013.01); *H04W 36/144* (2023.05); *H04W 36/304* (2023.05); *H04W 36/322* (2023.05); *H04L 67/10* (2013.01)

(56) References Cited

U.S. PATENT DOCUMENTS

| | | |
|---|---|---|
| 2004/0196813 A1 | 10/2004 | Ofek et al. |
| 2010/0188975 A1 | 7/2010 | Raleigh |
| 2010/0205301 A1* | 8/2010 | Ansari .................... H04L 47/83 709/225 |
| 2011/0197246 A1 | 8/2011 | Stancato et al. |
| 2013/0332967 A1 | 12/2013 | Chang |
| 2017/0006620 A1 | 1/2017 | Reis |
| 2017/0054493 A1 | 2/2017 | Marko et al. |
| 2017/0171803 A1 | 6/2017 | Maheswaranathan |
| 2019/0150080 A1 | 5/2019 | Davies et al. |
| 2019/0280920 A1* | 9/2019 | Wang ...................... G06F 9/455 |
| 2019/0387000 A1 | 12/2019 | Zavesky et al. |
| 2020/0186449 A1 | 6/2020 | Tofighbakhsh et al. |
| 2020/0204484 A1 | 6/2020 | Altman |
| 2020/0252689 A1 | 8/2020 | Crowe |

FOREIGN PATENT DOCUMENTS

| | | |
|---|---|---|
| KR | 10-2013-0022682 A | 3/2013 |
| WO | 2017/181029 A1 | 10/2017 |

OTHER PUBLICATIONS

International Search Report and Written Opinion received for PCT Patent Application No. PCT/US2020/015081, mailed on May 20, 2020, 10 pages.

Supplementary European Search Report and Search Opinion received for European Application No. 20745879.5, mailed on Sep. 9, 2022, 14 pages.

Notice of Allowance received for Israel Patent Application No. 285058, mailed on Oct. 28, 2024, 3 pages.

* cited by examiner

MULTIPLE ASPECTS OF COMMUNICATION IN A DIVERSE COMMUNICATION NETWORK

RELATED APPLICATION

The present application is a continuation of U.S. patent application Ser. No. 16/750,439, filed Jan. 23, 2020, entitled "MULTIPLE ASPECTS OF COMMUNICATION IN A DIVERSE COMMUNICATION NETWORK", which is a non-provisional application of and claims the benefit of U.S. Provisional Patent Application No. 62/796,443, filed on Jan. 24, 2019, and entitled "MULTIPLE ASPECTS OF COMMUNICATION IN A DIVERSE COMMUNICATION NETWORK", both of which are incorporated by reference in their entirety.

FIELD OF THE INVENTION

Embodiments of the invention are related to wireless communication; more particularly, embodiments of the invention are related to using multiple wireless communication networks to enable routing of data between an edge appliance and a data network, including switching to support mobility of the edge appliance by maintaining a connection to the data network.

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources. Content providers often consider factors such as latency of delivery of requested content in order to meet service level agreements or the quality of delivery service.

A communication network can include a plurality of user devices, such as mobile computing devices, communicating via a wireless communication network. In such wireless communication network approaches, the content provider can provision infrastructure equipment that facilitates that transmission of data by implementing a specified wireless interface standard. For example, cellular wireless communication networks are typically characterized as supporting communications via various combinations a combination of 3G, 4G, LTE, or 5G wireless air interface standards. Other wireless networks can implement shorter range wireless standards, such as Wi-Fi, which enable communications with computing devices within shorter physical proximity to the network equipment.

In some wireless communication networks, one or more computing devices may have capabilities to transmit data or facilitate communication functionality via diverse wireless communication networks, such as a cellular network and a non-cellular network (e.g., Wi-Fi). For voice call functionality, in some embodiments, when a voice over LTE (VoLTE) call is placed from a mobile device, the mobile device sets up a dedicated bearer to an LTE network (e.g., cellular network) so that the communication channel providing the voice call is protected.

Content or wireless service providers have moved data communications from the cellular LTE network and onto public and private non-cellular Wi-Fi networks. In one example, a Voice Over Wi-Fi (VoWIFI) has been developed to support voice call functionality in non-cellular wireless networks. From the perspective of the cellular wireless network service provider, all noncellular wireless networks, regardless of private or public, are considered untrusted for purposes of security. Accordingly, implementation of a Wi-Fi offloading, such as VoWIFI, requires establishment of a secure tunnel (e.g., IPSEC) over the Wi-Fi network to the cellular network infrastructure equipment. Such approaches effectively create a trusted connection between the mobile device and an appliance on the home LTE network, generally called the evolved packet data gateway (ePDG). Once that secure tunnel is established, the data corresponding to the "voice call" can be either initiated, or originated, on the untrusted Wi-Fi network or an established call can be migrated from the cellular network (e.g., the LTE network) onto the non-cellular network (e.g., the Wi-Fi network). Because of the need to use a secure tunnel, the non-cellular network (e.g., the Wi-Fi network) is in use as the transport network/platform for the voice call data communications. However, the voice call can be terminated or transitioned back over only to the trusted cellular network (e.g., the LTE network). Accordingly, current implementations of cellular networks and non-wireless cellular networks do not have capabilities for supporting switching (e.g., hand-offs) between non-trusted wireless networks.

Similar issues arise with communications associated with communications via a cellular network and other types of wireless networks, such as satellite-based wireless networks. For example, a cellular network (e.g., an LTE network) treats a satellite-based wireless network connection as untrusted (similar to a Wi-Fi-based wireless network). In a manner similar to discussed above, when the backhaul of the network changes from the one that it initially used to setup the IPSEC tunnel to a different transport link, the IPSEC tunnel will collapse and the call will drop.

Generally, under current approaches, infrastructure providers, the service providers, and the standards do not provide for call failover between multiple untrusted networks. In some applications, link bonding routers provide a seamless experience as all transport links are effectively bonded between the user router and an endpoint. However, as 100% of the traffic is bonded and transmitted through a secure tunnel, this causes inefficiencies in network traffic. This solution routes specific traffic only through the single session tunnel while other traffic such as disruption tolerant traffic (e.g., web browsing, file transfer, email, buffered streaming, etc.) can be routed through the typical transport routes.

However, communications require infrastructure. Terrestrial communications (e.g., LTE and 5G), which rely on a fixed network of towers and radios, may become unreliable during a disaster. Physical damage to cell sites or network congestion can lead to reduced performance.

There has been a renewed focus on building resilient and protected cellular networks that give responders priority on the network and ones that implement rapidly deployable infrastructure to mitigate physical damage. Reliance on terrestrial networks alone is simply not enough in situations when the network must work.

Advances in non-terrestrial satellite networks have been made. These include the introduction of new electronically-scanned antennas based on a diffractive metamaterials concept referred to herein as Metamaterial Surface Antenna Technology (MSAT). Illustratively, the MSAT enables electronic scanning from a single flat panel with no moving parts. By using liquid crystals as a tunable dielectric at microwave frequencies, a MSAT antenna structure facilitates large angle (>75°) beam scanning and fast tracking (>30°/second). This enables high-throughput connectivity to satellites from even the smallest moving platforms with little to no operator intervention.

The MSAT antenna structure has been deployed around the world on platforms ranging from two-seat all-terrain vehicles, small inflatable boats, super yachts, tractors, passenger vehicles, and first responder vehicles. Operationally, once the terminal is powered on, an internal global positioning system (GPS) receiver and inertial measurement unit (IMU) determine the position and the attitude of the antenna. From there, the antenna automatically determines the location, frequency, and polarization of the optimal satellite to track, and forms an electronic beam to that satellite. As the vehicle moves, continuous inputs are made to the tracking algorithm on the antenna so that the beam stays locked on the satellite.

SUMMARY

A multi-wide area network (WAN) incorporating both satellite-based communication networks and cellular networks (e.g., an LTE network) is disclosed. In one embodiment, the WAN is implemented with a communications framework comprising: an edge appliance comprising a satellite modem interconnect for coupling to a satellite modem external to the edge appliance, a cellular modem interconnect for coupling to a cellular modem external to the edge appliance, a switch coupled to the satellite and cellular modem interconnects, and a processing node coupled to the switch and comprising a router to switch traffic between the satellite modem interconnect and the cellular modem interconnect when the edge appliance communicates with a public data network using a satellite link or a terrestrial cellular link, respectively; and a connectivity platform configured for connection to the edge appliance, the connectivity platform comprising a broker/integrator component configured to operate as a broker and an integrator between the edge appliance and both connectivity service providers and business support systems that perform subscription management to enable the edge appliance access to the satellite and terrestrial cellular links. In one embodiment, the processing node of the appliance is configured to switch between use of the satellite and terrestrial cellular links when the edge appliance is mobile to maintain a connection to the data network.

BRIEF DESCRIPTION OF DRAWING

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
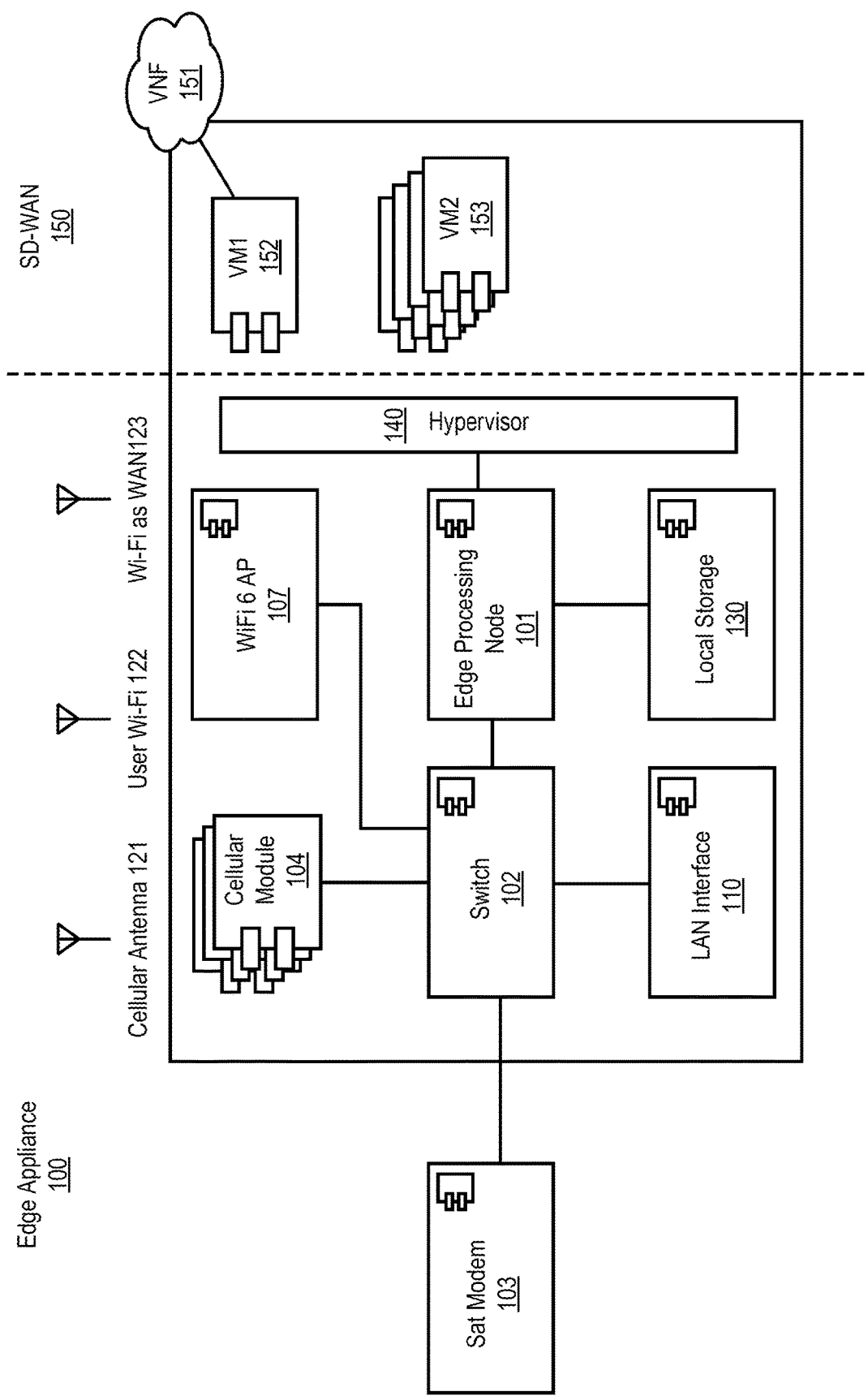
FIG. 1 illustrates one embodiment of an edge appliance.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A multi-wide area network (WAN) incorporating both satellite-based communication networks and cellular networks (e.g., an LTE network) is disclosed. In one embodiment, the multi-WAN network provides access to one or more data networks. In one embodiment, the data network comprises a public data network, such as, for example, the Internet. In one embodiment, the access is provided via satellite communication or cellular communication. In one embodiment, the satellite communication is in the form of the MSAT connecting to geosynchronous satellites. In one embodiment, the satellite communication connection is via Ku- or Ka-bands, though the techniques disclosed herein are not limited to the use of those bands. Satellite networks are considered reliable and resilient, and commercial cellular networks have been deployed across a majority of the developed and developing world and cover a significant portion of the world's populated areas. Combining the benefits of the low-cost and high-performance cellular network with the reliability and resilience of the satellite network leads to anytime and anywhere connectivity.

A communications framework to support the multi-WAN network is disclosed. In one embodiment, the communication framework comprises an edge appliance and a connectivity platform configured for connection to the edge appliance. In one embodiment, the edge appliance comprises a satellite modem interconnect for coupling to a satellite modem external to the edge appliance, a cellular modem interconnect for coupling to a cellular modem external to the edge appliance, a switch coupled to the satellite and cellular modem interconnects, and a processing node coupled to the switch and having a router to switch traffic between the satellite modem interconnect and the cellular modem interconnect when the edge appliance communicates with a public data network using a satellite link or a terrestrial cellular link, respectively.

In one embodiment, the edge appliance is communicably connected to a satellite link using the satellite modem interconnect and to a terrestrial cellular link using cellular modem interconnect when switching traffic being communicated between the edge appliance and the public data network. In one embodiment, the edge appliance is simultaneously connected to a satellite link and to a terrestrial cellular link. In one embodiment, the router is configured to switch traffic from routing on one network to the other (e.g., switching from a satellite-based network to a cellular network or vice versa) based on conditions of the satellite link and the terrestrial cellular link. In one embodiment, the conditions comprise link performance metrics.

In one embodiment, the edge appliance further comprises a communication interface for access by a local network. In one embodiment, the communication interface comprises a Bluetooth interface, a Wi-Fi interface and/or a direct Ethernet interface.

In one embodiment, the connectivity platform comprises a broker/integrator component configured to operate as a broker and an integrator between the edge appliance and both connectivity service providers and business support systems that perform subscription management to enable the edge appliance access to the satellite and terrestrial cellular networks for use in communicating with a data network (e.g., a public data network (e.g., the Internet)).

In one embodiment, the connectivity platform comprises a cloud-based microservices architecture that utilizes microservices that are part of a larger application and are performed autonomously. In one embodiment, the microservices provide virtual network functions (VNFs). In one embodiment, the VNFs comprise wide area network (WAN) optimization, content management, and/or dynamic routing policies for the edge appliance.

In one embodiment, the microservices architecture comprises a network management enclave for making routing decisions for the edge appliance based on traffic shaping and steering. In one embodiment, the traffic shaping and steering is based on content and/or data type. In one embodiment, the traffic shaping and steering comprises software-defined wide area network (SD-WAN) traffic shaping and steering. In one embodiment, the software-defined wide area network (SD-WAN) traffic shaping and steering is operable to identify traffic demand for a type of content and determine whether the satellite link or the terrestrial cellular link is to route that type of content.

In one embodiment, the microservices architecture comprises a plurality of enclaves configured to control the edge appliance via a direct interface to the broker/integrator component. In one embodiment, the plurality of enclaves comprises a network management enclave to provide network management for interfacing the edge appliance to the public data network, including logic to make routing decisions for the edge appliance based on traffic shaping and steering, an application management enclave to provide data management and content management for interfacing the edge appliance to the public data network, and a security management enclave to provide security management for interfacing the edge appliance to the public data network.

In one embodiment, the communications framework further comprises a satellite terminal having a satellite modem and an electronically scanned antenna aperture coupled to the satellite modem. In one embodiment, the electronically scanned antenna comprises a metasurface-based electronically scanned antenna, such as, for example, those described in further detail below. In another embodiment, the electronically scanned antenna comprises a phased array-based antenna. In yet another embodiment, the satellite terminal includes a flat panel antenna other than those described above or another type of well-known satellite antenna, such as, for example, but not limited to a gimbaled, parabolic dish antenna. a software defined antenna, etc.

FIG. 1 illustrates one embodiment of an edge appliance. Referring to FIG. 1, edge appliance 100 includes edge processing node 101 that is coupled to switch 102. Switch 102 is coupled to one or more cellular modules 104 for connecting to cellular networks via cellular antennas 121. Switch 102 is also coupled to an external satellite modem 103, which is used to connect to satellite-based networks using satellite apertures. Switch 102 is also coupled to a LAN interface 110 for coupling to a local area network (LAN) via a wire connection and to a Wi-Fi interface that is used to connecting to a user via user Wi-Fi antenna 122 or to a WAN via antenna 123 using Wi-Fi application 107.

Edge processing node 101 controls performance of the edge router function to route data using the satellite and cellular-based networks. In one embodiment, edge processing node 101 enables access to content via public data networks through satellite and cellular modem interconnections to satellite modem 103 and a cellular modem associated with cellular modules 104. This enables edge appliance 100 to maintain contact with a data network through terrestrial links or non-terrestrial satellite links. When there is a connection from the data network through a non-terrestrial link, satellite modem 103 is coupled to a satellite antenna. When maintaining contact to the network through a terrestrial cellular link, cellular modules 104 provide a connection via LTE or another cellular based modem and their associated antennas.

Edge processing node 101 includes the routing logic to control switch 102 to switch traffic between the available networks (e.g., satellite-based network and cellular-based network). In one embodiment, the routing logic of the edge processing node 101 switches traffic between the networks based on conditions. In one embodiment, edge processing node 101 uses conditions of the link associated with link performance metrics (e.g., latency, packet loss, jitter, etc.) to perform routing of data using the available networks. In one embodiment, edge processing node 101 performs automatic switching and traffic shaping based on the conditions such as, for example, link performance metrics. The routing logic and function of edge processing node 101 is described in more detail below.

In one embodiment, edge appliance 100 utilizes a software-defined wide area network (SD-WAN) 150 as part of maintaining contact to the data network through the terrestrial cellular links and non-terrestrial satellite link. In one embodiment, edge processing node 101 interfaces with SD-WAN 150 via hypervisor 140. In one embodiment, SD-WAN 150 enables access to virtual network functions (VNFs) 151 associated with virtual machines 152 to add additional controls to the routing functions performed by edge processing node 101. In one embodiment, the additional VNFs for which SD-WAN provides access include functions such as traffic shaping and steering on behalf of the edge processing node 101. In one embodiment, the traffic shaping and steering may be based on content and data type. In one embodiment, the SD-WAN 150 provides access to functions that identify traffic demand and determine the base available transport network for which to route the specific of type of traffic. In one embodiment, the traffic demand is based on the type of content that is being routed. For example, in one embodiment, the SD-WAN logic routes different types of content over different transport networks. In one embodiment, the determination of the best available transport network for which to route a specific type of traffic is based on artificial intelligence (AI) and machine/deep learning. Thus, SD-WAN 150 provides access to a cloud-based infrastructure that helps edge processing node 101 with routing decisions.

Figure 2A:
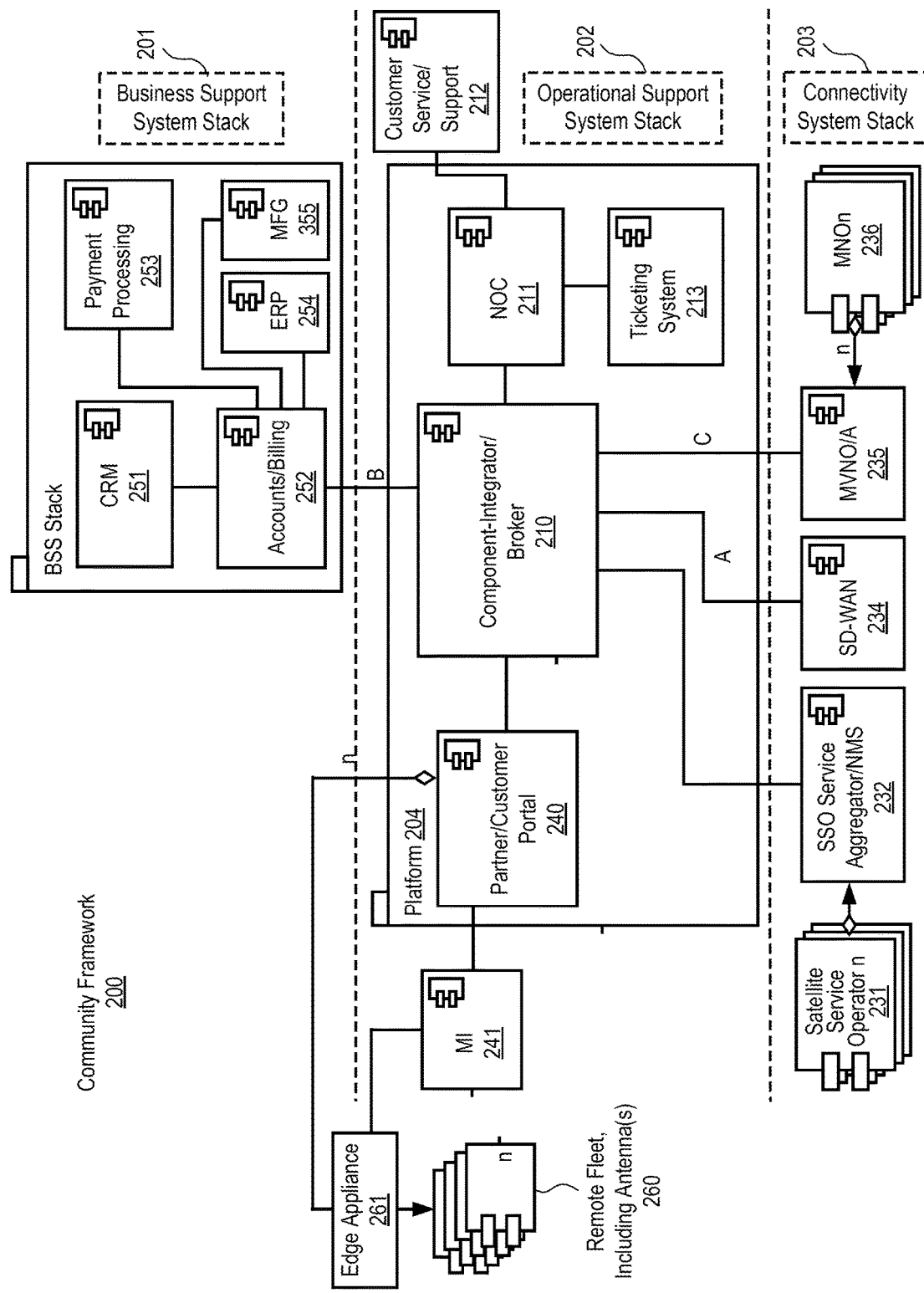
FIG. 2A illustrates one embodiment of a connectivity framework for which an edge appliance is part.

In one embodiment, the edge compute infrastructure is integrated into the connectivity platform. FIG. 2A illustrates connectivity framework 200 for which the edge appliance (e.g., edge appliance 100 at FIG. 1) is part. Referring to FIG. 2A, connectivity framework 200 is uniquely partitioned into three partitions: a business support system (BSS) stack 201, an operation and support systems (OSS) stack 202, and a connectivity services (CS) stack 203. In one embodiment, BSS stack 201 comprises a subscription management platform that includes accounts/billing module 252, payment processing module 253, customer relationship management (CRM) module (e.g., Salesforce CRM software) 251, an Enterprise Resource Planning (ERP) module (e.g., Oracle software) 254 and MFG module (e.g., Arena software) 255. In one embodiment, each of these modules is implemented with software executing on one or more processors. In one embodiment, the BSS stack 201 located in the cloud and connects to OSS stack 202 using an interface to component integrator/broker 210 of OSS stack 202.

CS stack 203 includes the number of components that interface directly to component-integrator/broker 210. These include a satellite service operator service (SSO) aggregator/network management system (NMS) 232 that is communicably coupled to one or more satellite system operators (SSOs) 231. SD-WAN 234 is also coupled directly to component-integrator/broker 210. The mobile virtual network operator aggregator (MVNOA) 235, which is communicably coupled one or more mobile network operators (MNOn) 236, is also coupled directly to component-integrator/broker 210.

With this partitioning, component-integrator/broker 210 bridges the terrestrial and non-terrestrial networks interface to the connectivity platform. In one embodiment, component-integrator/broker 210 is coupled to a network operations center (NOC) 211, which in turn is coupled to a customer service/support module (external to platform 200) and a ticketing system 213. In one embodiment, NOC 211 is also coupled to security operations center/integrated operations center (SOC/IOC) (e.g., SOC/IOC 214 of FIG. 2B).

Component-integrator/broker 210 is also coupled to the edge appliances through Partner/Customer Portal 240, such as, for example, edge appliance 261. Edge appliance 261 is communicably coupled to one or more antennas (e.g., satellite antennas, cellular antennas, etc.) that are in the remote fleet (e.g., vehicles, boats, etc.) 260. In one embodiment, Partner/Customer Portal 240 interfaces to vehicles that contain the edge appliances with its interconnections to the satellite-based and cellular networks. These vehicles may be part of fleets. In one embodiment, the edge appliances, such as edge appliance 261, communicate to Partner/Customer Portal 240 via a management interface (MI) 241. In one embodiment, MI 241 allows users of different hierarchies and functions such as, fleet managers, value-added reseller (VAR), and field service representative (FSR) to activate/deactivate services, view and change subscriptions, view current and historical usage, submits tickets/CS calls, and perform installation and provisioning based on a defined policy applied to that user type.

Figure 2B:
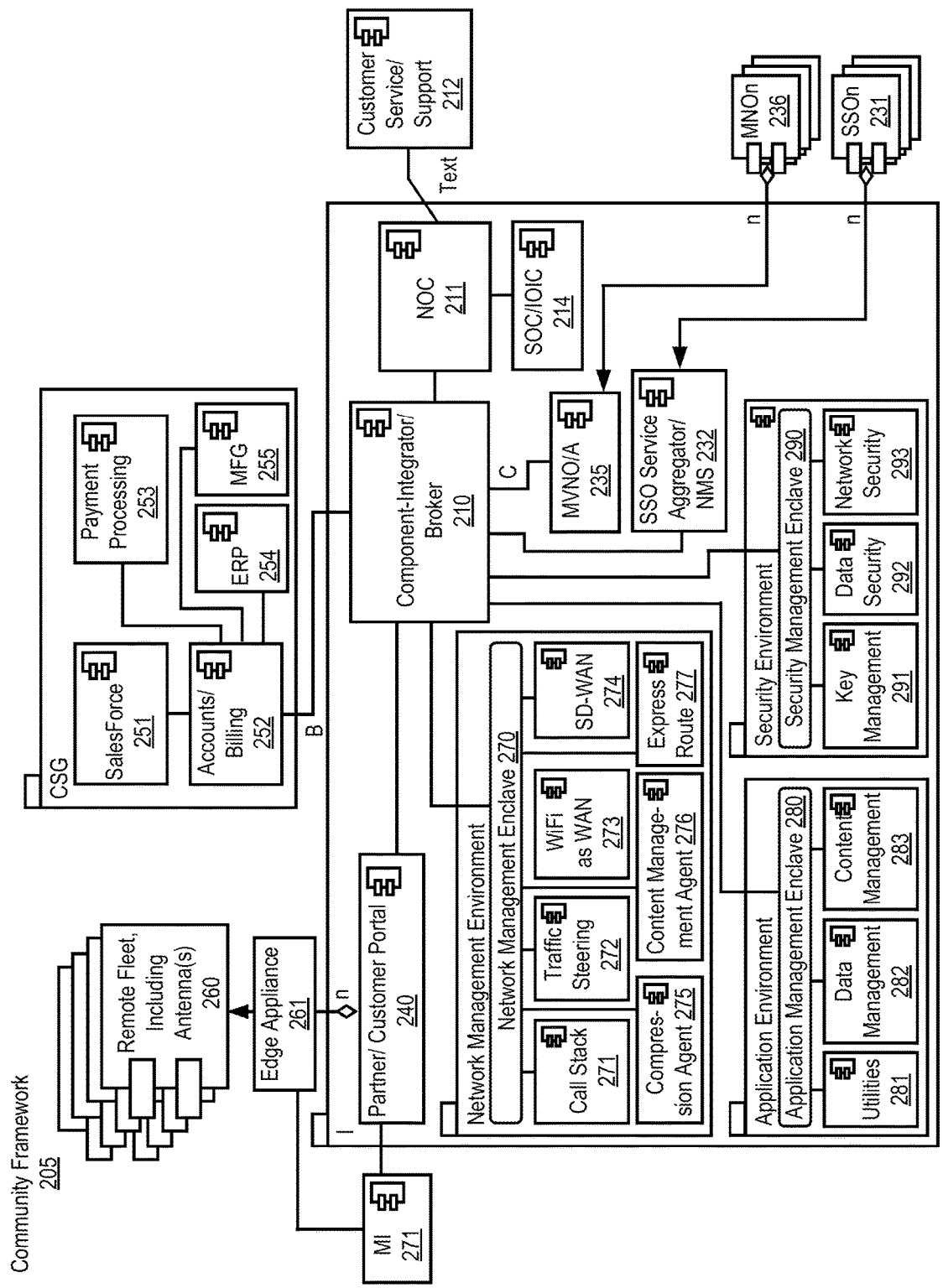
FIG. 2B illustrates another embodiment of a platform that includes multiple enclaves.

FIG. 2B illustrates another embodiment of a connectivity framework. Referring to FIG. 2B, connectivity framework 205 includes many of the same elements that are part of connectivity framework 200. However, connectivity framework 205 also includes multiple enclaves. In one embodiment, each of the functions in the enclaves is performed by a microservice as part of a microservice architecture (MSA). That is, these enclaves include logic that executes microservices associated with the MSA to perform functions using autonomous agents for the platform on behalf of the edge appliances. These microservices are application-based functions that are executed by one or more processors (e.g., processing cores). In one embodiment, the one or more processors (e.g., processing cores) are part of one or more virtual machines executing in a cloud-based environment.

In one embodiment, a network management environment directly interfaces to integrator/broker 210 and includes a network management enclave 270. In one embodiment, the network management enclave 270 includes the call stack logic 271 for maintaining a call stack, traffic steering logic 272 to perform traffic steering, Wi-Fi as WAN logic 273 for enabling WAN Wi-Fi access, SD-WAN logic 274 for facilitating a SD-WAN, compression agent 275 for performing compression relates functions, content management logic 276 for performing content management, and an express route logic 277 for performing routing.

In one embodiment, an application environment includes an application management enclave 280 that is interfaces directly to the integrator/broker 210. In one embodiment, the application management enclave includes utility services 281, data management services 282, and content management services 283.

In one embodiment, a security environment includes a security management enclave 290 that is directly interfaced to the integrator/broker 210. In one embodiment, security management enclave 290 includes logic for performing key management 291, data security 292 and network security 293.

Also, in FIG. 2B, the MVNOA 235 and SSOA/NMS 232 are part of platform 200 and interface with one or more MNOs and one or more SSOs, respectively.

Edge Appliance Functionality

To fully realize a seamless and connected multi-WAN, embodiments described herein provide for one or more components with functionality within one or more communication networks to determine how to route the data using the available wireless communication networks. In one embodiment, the edge appliance determines which available wireless communication network to use to route the data. If only one network is available, then edge appliance selects the available network to route the data. If no network is available, the edge appliance does not route the data and the communication attempt fails (e.g., if there is a prohibited network communication). In one embodiment, if multiple, diverse networks are available for data connectivity, the edge appliance implements decision making logic to select data connectivity.

The ability to operate anywhere, regardless of fixed coverage, represents a significant improvement in operational efficiency. The demand on individuals that are part of remote fleets is also significantly reduced since no additional training or tools are needed to use the multi-WAN itself—it is automatic. This solution allows such individuals to effectively operate anywhere, without having to consider existing network coverage.

In one embodiment, the edge appliance is configured to perform datalink-aware routing. That is, in one embodiment, the edge appliance selects individual wireless communication networks to route data based on the type of traffic and/or content. Thus, the edge appliance does not consider all network traffic equal or the same for purposes of selecting network routing. For example, if the underlying data or the application generating the data is characterized by the service provider as requiring instant sharing, the edge appliance may select a particular wireless communication network that meets the needs for instant sharing. In another example, if the underlying data or application generating the data is characterized as functioning poorly on a higher latency network connection (e.g., satellite-based wireless network), then the edge appliance may select a particular wireless communication network with a lower latency (e.g., a cellular communication network). In another example, the underlying data or application generating the data may be characterized as latency tolerant but requires the ultra-high reliability and dependability. Accordingly, the edge appliance selects a satellite-based wireless connection. In yet another example, if the edge appliance is in an environment that is moving, such as a vehicle, one or more wireless communication networks may be unavailable because the edge appliance is outside the cover area (e.g., outside the coverage area of a functional cellular network (e.g., an LTE network)) and thus, the edge appliance decides to route the data via an available satellite-based network. If the cellular network is re-established or considered to be within a threshold of stability, the edge appliance may determine to switch back to use the cellular network to route the data.

By making data-aware routing decisions, the router or routing function of the edge appliance discovers or has access to information that identifies communication network availability (e.g., satellite, wireless (e.g., 5G) connection, etc.) and individual communication link characteristics, and determines attributes of at least a subset of links or all the links, defined according to a set of criteria. Based on the characteristics of the data and whether it meets the characteristics of the communication link or links that can be used to route the data, the edge appliance makes a data-aware routing decision. Note that the data being transferred may be characterized according to the application generating the data. For example, if an emergency application is characterized as requiring low latency transmission channels, then data generated by the application could be attributed with the same characterizations as the application. In one embodiment, the edge appliance makes a routing decision based on a different characterization of the data. For example, in one embodiment, the edge appliance designates data as being of high importance, regular importance, or low importance and then selects a wireless communication network to route the data based on that characterization.

In one embodiment, the edge appliance, using its router or routing logic, is able to divide up the data for routing and route that traffic using multiple communication links. In one embodiment, the edge appliance is configured with a static radio-aware router that is configured or discovers parameters of the different available links and includes routing logic that can decide to combine communications using multiple links to route data.

In one embodiment, the edge appliance has a router or routing logic that uses different services, such as, for example, artificial intelligence (AI) and machine learning/deep learning services, to perform link selection so that connectivity is maintained (e.g., connectivity with a public data network). For example, the edge appliance implements decision making logic, such as executed in conjunction with a machine learning algorithm, to enhance over-the-horizon navigation connectivity by collecting the connectivity history of a fleet and informing the user in the fleet or administrator of the upcoming communications landscape. For example, if a vehicle with the edge appliance is moving to location X and the last time a vehicle moved to that location, it lost a type of communication link (e.g., a satellite link), the decision-making logic of router of the edge appliance may determine to switch the connection of the vehicle before it reaches location X to maintain connectivity. That is, the decision-making logic in the router of the edge appliance is configured to maintain connection to the public data network by switching traffic between the satellite or terrestrial cellular links prior to when the edge appliance arrives at location X in response to predicting that a connection to either the satellite link or the terrestrial cellular link will not be available when the edge appliance is at location X. This predictive switching between satellite and cellular networks maximizes availability and in one embodiment is based on pattern-of-life information. This information can include, for example, the satellite terminal having information (or access thereto) of where the line-of-site to the satellite is lost, and knowing ahead of time that a switch to terrestrial cellular link will be made at or very near that location (e.g., a bridge, building, trees along an established/predictable route, etc.). In another example, if the edge appliance is aware that pushing a particular video through the connection may result in packet loss, the decision-making logic of the router can characterize the potential for loss a priori and implement a routing decision based on the characterization.

Thus, using datalink-aware routing, the edge appliance is able to route certain types of data over particular links while maintaining connectivity.

Figure 3:
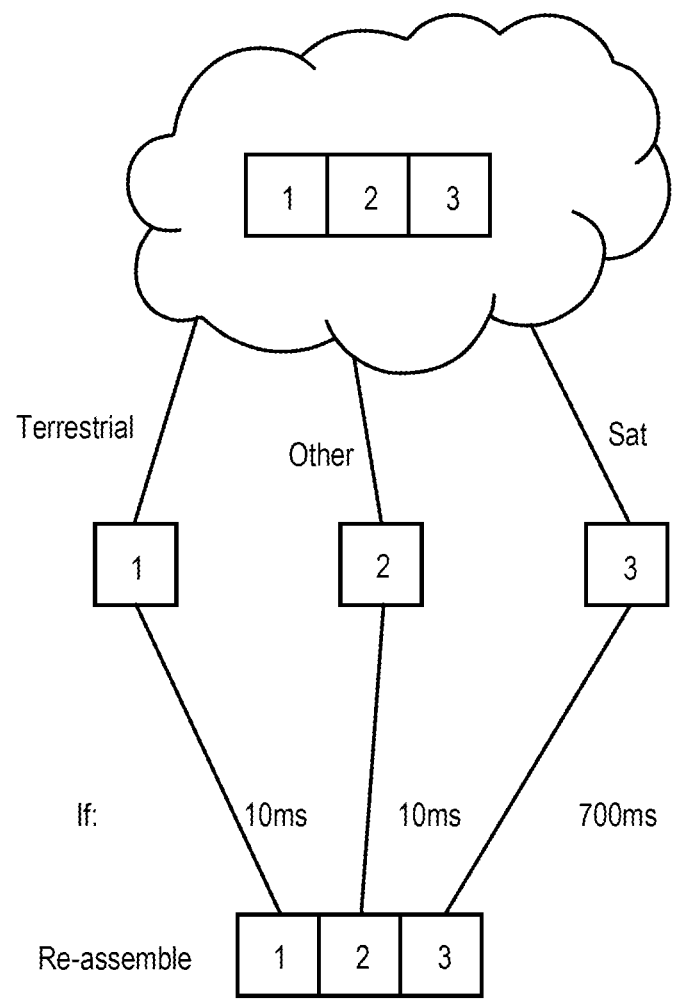
FIG. 3 illustrates an example of IP packet reassembly.

In one embodiment, the edge appliance divides network traffic and routes it over multiple different communication links. In such as case, in one embodiment, IP bonding is used to enable reassembly of the data. FIG. 3 illustrates an example of IP packet reassembly. In accordance with IP bonding, packets are reassembled in a specific order. Referring to FIG. 3, IP bonding uses bonded latency where, in the example shown in FIG. 3, the reassembly process waits 700 ms to re-assemble 1-3 into one packet and then waits another 700 ms for the next packet (e.g., 4, 5, 6) before reassembly.

In one embodiment, the edge appliance is able to use both the satellite link and the terrestrial link simultaneously such that both are used to route data at the same time. This may involve using the same antenna or different antennas. This enables the edge appliance to route data correctly over multiple communication paths while maintaining the most connectivity possible. Rather than switching and breaking sessions and closing and reopening tunnels when switching to a different link, the edge appliance makes this seamless.

In one embodiment, the edge appliance operates in a network with the carrier aggregation and the uplink and downlink communications paths have different owners. For example, one owner may own part of the spectrum and another owner owns the other part. These parts of the spectrum may or may not be contiguous.

In one embodiment, the edge appliance makes content-specific routing decisions. In this case, rather than splitting up data into individual packets of data, the edge appliance sends data over one network or the other based on the data's content. For example, in one embodiment, the edge appliance divides data content by sessions, and the data for each different session is routed over different links, such as satellite-based routing, LTE cellular, etc. In one embodiment, the edge appliance's router or routing logic determines that both links are available (e.g., satellite and cellular links or more are available) and routes the data over both links based on the content. For example, in one embodiment, if content is latency-tolerant, like an email or file transfer or download, the edge appliance selects one link, while if the content isn't latency resilient and requires real-time routing, the edge appliance routes it over a lower latency link.

In one embodiment, the edge appliance includes an edge router and routing logic to perform backhaul-aware routing. In this embodiment, the router determines the processing under which the data is to undergo and uses that determination as a factor in selecting the communication link for routing.

Generally, a vehicle can generate or access information related to the current environment. In one embodiment, the vehicle accesses sensors that determine whether a rate of travel exceeds the speed limit. In one embodiment, the edge appliance learns status information about the vehicle (e.g., what the vehicle is currently doing) and its router make routing decisions on connectivity based on this status information. For example, a first responder vehicle knows that when the responder flips the lights and sirens on, it means the vehicle is responding to an incident, and the router knows that when the lights are on, the vehicle is responding to an incident and can keep routing data over on satellite link (e.g., the most reliable network) because the responders need constant communication.

In one embodiment, the edge appliance includes a control architecture that allows a user to influence control of the routing decisions of the edge appliance. In one embodiment, the control impacts content-routing decisions of the edge appliance. Such an arrangement allows individual users or groups of users to define attributes of the communication networks used for routing data. In turn, the router or routing logic of the edge appliance can process the information as part of the content routing decisions. For example, a vehicle may be provided with hardware or software that generates a command/request to switch connectivity to different networks in contrast to the network that is currently routing the data (e.g., switch to a satellite network earlier). In another example, a user sets the controls to keep connectivity and activity at a lowest price, and the edge router of the edge appliance uses this information to make sure its data routing is at the lowest price. In yet another example, a user of the platform may choose between two characteristics, such as, for example, consistent latency over variable latency (e.g., quality of service (QoS)) as the routing priority or may select from categories of communication (e.g., quality, performance, etc.) in which the individual routing attributes are not selected but are abstracted. In either of these cases, the edge router of the edge appliance uses this information to make sure its data routing is in accordance with the user-specified control information. In one embodiment, the edge appliance receives this user-specified control information over a user interface (e.g., a wireless interface (e.g., Wi-Fi, Bluetooth, etc.), a wired interface (e.g., direct Ethernet)).

In one embodiment, as mentioned above, network function virtualization (NFV) is provided. In NFV, the routing of data is partitioned into multiple portions and routing decision are conducted based on partitions. One partition or division of the network can be low latency, while another involving user data, etc. can be routed into different slices according to different virtual networks in the 5G network. Each slice has different characteristics (e.g., different priorities). In this embodiment, the edge appliance allocates which network link can be selected based on latency tolerance, price, network function (e.g., vehicle-to-vehicle, infotainment, machine to machine, etc.), ability of the data to be divided easily into different network functions, etc. In the edge appliance, the router understands the characteristics of the traffic and uses that to feed the traffic into the 5G system.

In one embodiment, the edge router of the edge appliance is implemented in a vehicle and uses a software-defined WAN router (SD-WAN) to make routing decisions to determine which path to route user data to a public data network (e.g., Internet). In one embodiment, the use of an SD-WAN ensures that there is always a connection to the Internet via the most optimized network currently available. As the physical networks change as the edge appliance is moving (when part of a vehicle), the SD-WAN's network routing adjusts and re-optimizes. In one embodiment, the SD-WAN monitors link health of possible routes to the Internet and chooses the most applicable route at any given time.

Figure 4A:
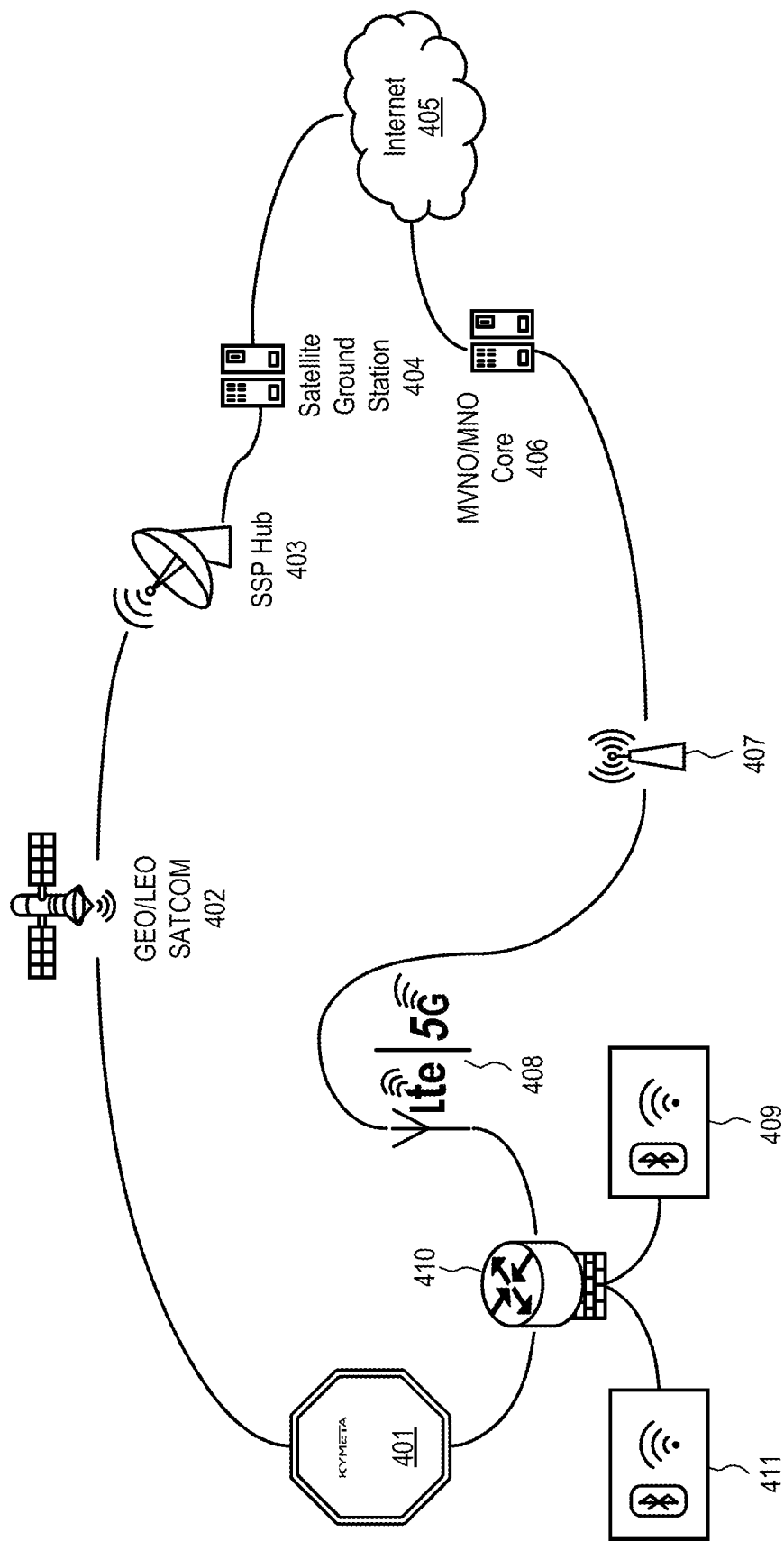
FIG. 4A illustrates a network framework that includes a software-defined wide area network (SD-WAN).

FIG. 4A illustrates an SD-WAN (SDWR) between the user and vehicle networks and the backhaul networks to enable switching and routing. Referring to FIG. 4A, edge appliance 410 with the SD-WAN uses a satellite link via a satellite terminal 401 to connect to a GEO/LEO satellite 402 to access a data network, such as the Internet 405, via hub 403 and satellite ground station 404. The SD-WAN uses a cellular link via a cellular link 408 (e.g., LTE, 5G, etc.) via base station 407 to access the Internet 405, via MVNO/MNO core 406. The routing to facilitate access to the Internet by the SD-WAN enables routing of data to and from one or more users, such as users 409 and 411.

Figure 4B:
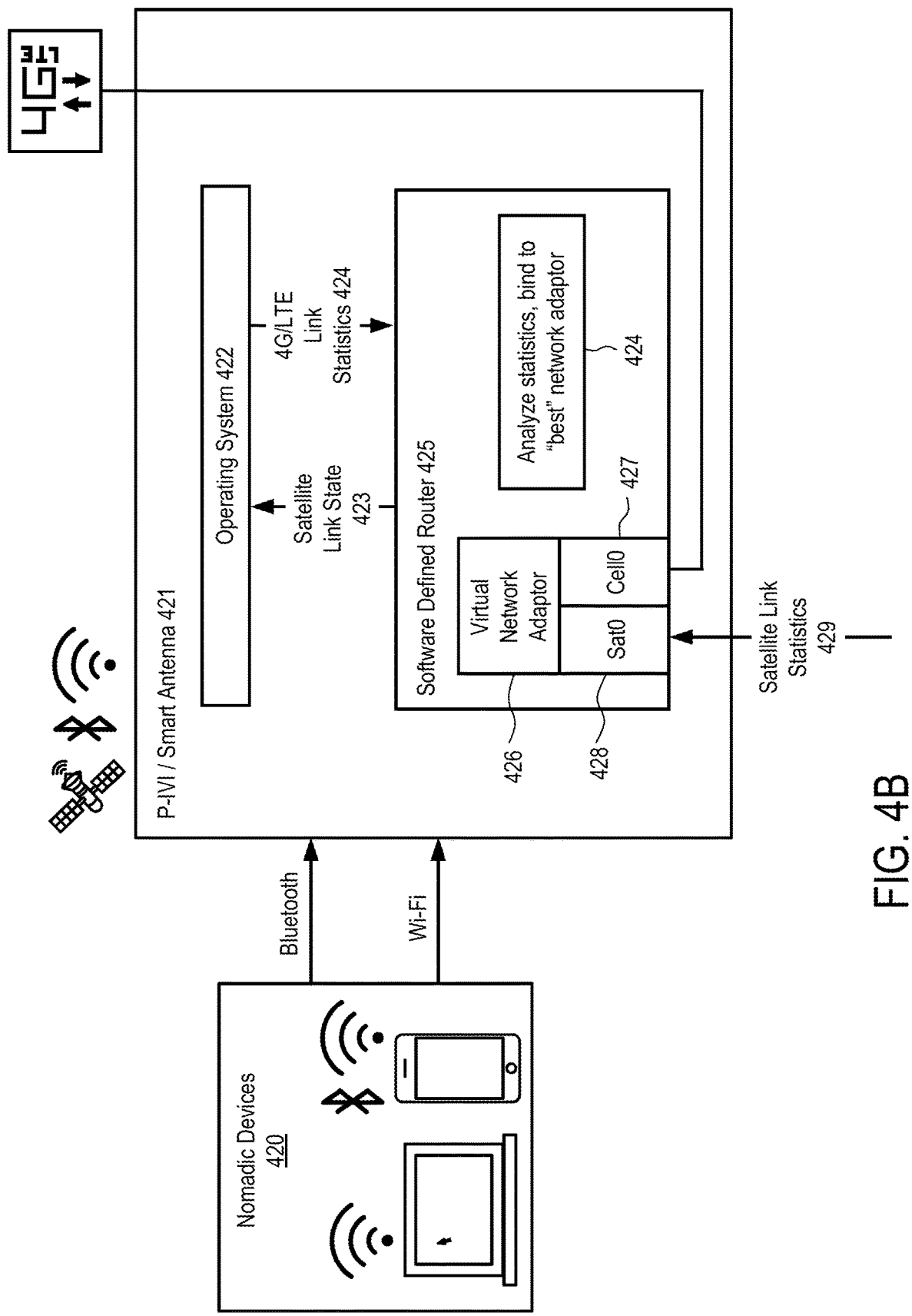
FIG. 4B illustrates an edge appliance with a software-defined router.

FIG. 4B illustrates an edge appliance with a software-defined router. Referring to FIG. 4B, the edge appliance includes software-defined router 425 along with an antenna 421 and an operating system 422 (e.g., QNX). Software-defined router 425 receives satellite link statistics 429 and cellular (e.g., 4G/5G/LTE) link statistics 424 and analyzes those statistics to select either a satellite link, via the virtual network adaptor 426 and the satellite interconnect 428 or a cellular link, via the virtual network adaptor 426 and the cellular interconnect 427, to route data to and from a data network such as the Internet. In one embodiment, software-defined router 425 also provides satellite link state information 423 to the operating system 422.

In one embodiment, the edge appliance communicates with nomadic devices 420 (e.g., smart phones, laptop computer systems, and other portable devices in vehicles) containing the edge appliance) via wireless communication (e.g., Wi-Fi, Bluetooth). This enables devices 420 to access data networks, such as, for example, the Internet via the edge appliance.

In one embodiment, communication from individual devices is improved based on backhaul connectivity (e.g., connectivity from the vehicle router to the Internet) via multiple sources including satellite communications, licensed wireless communications (e.g., LTE, 5G, other cellular communications), and unlicensed wireless communications (e.g., Wi-Fi). In one embodiment, front haul connectivity, such as Wi-Fi access points and wired networks, delivers services to the users and systems within the vehicle ecosystem. As the users and systems represent different data demands, and as the vehicle moves causing it to be in a dynamic communications environment with varying backhaul link availability, SD-WAN selects the route for the user or vehicle traffic to connect to the Internet or other public data networks both for the receipt and transmission of information.

Not all data in and out of the vehicle requires the same level of urgency. Some data can be offloaded in time segments measured in days, hours, milliseconds, etc. In one embodiment, the SD-WAN parses this data and intelligently decide what data is to be sent and when. This decision may result in determining that some data is to be sent immediately and determining other data can be held for the least expensive and most latency-tolerant way of moving data.

In one embodiment, the SD-WAN's connectivity software intelligently and potentially optimizes routes data between the satellite transceiver antenna module hardware and other channels (including cellular LTE, 5G, V2X and Wi-Fi). Likewise, in one embodiment, the communication platform intelligently decides based on business rules such as, for example, price, latency, security, predicted/historical QoS and size which communication network is the choice (e.g., optimal choice) to route the data.

In one embodiment, the SD-WAN's connectivity software constantly determines the best network to use out of available networks (e.g., satellite LEO, satellite GEO, other satellite, terrestrial 5G cellular, terrestrial 4G/LTE cellular, etc.). The SD-WAN's connectivity software is integrated and takes actions to maintain applications sessions. In one embodiment, the user of the edge appliance never knows that they are switching between networks to fulfill their communication needs. There is a consistent pole-to-pole ubiquitous global user experience and performance with the same minimum quality of service. In one embodiment, the satellite system is primarily LEO with other satellite systems used as required, and the primary terrestrial system is the best cost 5G or 4G/LTE cellular network.

In one embodiment, the software defined wide area network implementation uses metrics obtained from each access technology to adaptively and continuously determine the best route. In addition to using physical link characteristics, information such as one or more of traffic type, specific origination and destination of traffic, traffic patterns, data link cost, subscription levels, and other non-physical information are utilized to dynamically adjust the active backhaul link. This enables the communication network services of different communication networks to be blended.

In one embodiment, as communications services are blended, the SD-WAN router provides single data sessions for specific types of data so that overall quality of service and user experience is maintained. For example, the connectivity software of the SD-WAN router enables the continuity of voice over LTE (VoLTE) calls as they hand over to voice over Wi-Fi (VoWiFi) calls. In one embodiment, as the customer's device connects to the vehicle Wi-Fi network, any call placed will originate as a VoWiFi call. When the connectivity software switches the primary backhaul link (i.e., terrestrial cellular to satellite), the SD-WAN router ensures the continuity of the already established call. In one embodiment, multiple data paths are initially available to enable connectivity to the vehicle. In one embodiment, when using any of the transport networks, a persistent secure tunnel is created across the wireless transport link. For example, if there is at least one transport link available, the tunnel is built for routing data using a virtual endpoint. Such a secure tunnel may be used to support voice calls, and remains remain even as the transport link changes.

In one embodiment, the edge appliance includes a cache and proxy server for acknowledging transmissions, missing packet recovery, securing and positioning data for vehicle disposition. The cache and proxy servers hold and queue data for the Best Cost return from the vehicle to the cloud. Data, services, and infrastructure are built on a satellite constellation (e.g., a low earth orbit satellite constellation), distributed ground network, geostationary space segment and associated ground segment, and a network-based scalable and secure service management platform.

Figure 5:
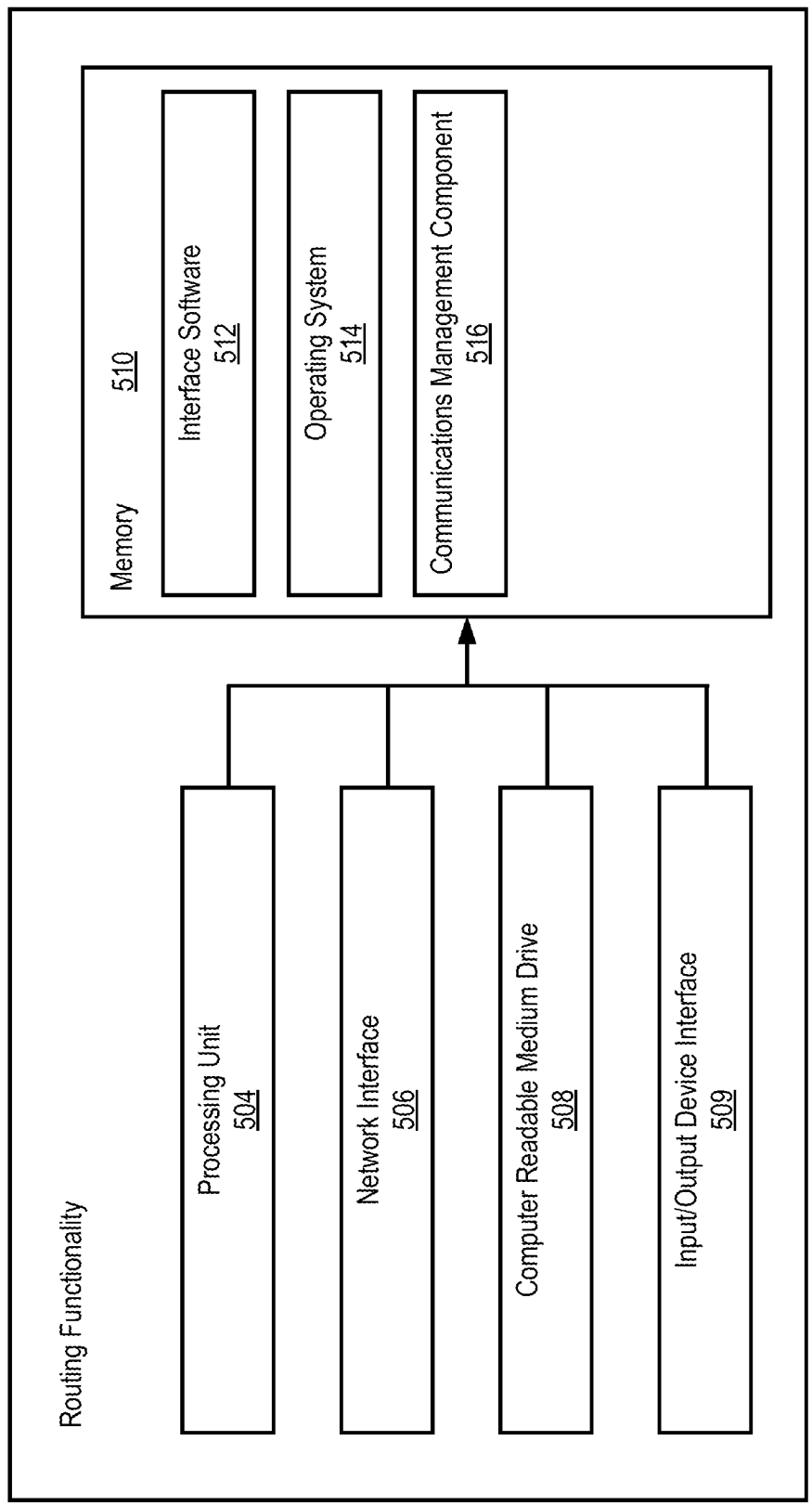
FIG. 5 depicts one embodiment of an architecture for an illustrative computing device for implementing various aspects of the edge routing functionality of an edge appliance.

FIG. 5 depicts one embodiment of the architecture for an illustrative computing device for implementing various aspects of the edge routing functionality of the edge appliance in accordance with aspects of the present application. In one embodiment, the network routing functionality is part of the instantiation of virtual machine instances or otherwise interact with network services. Alternatively, the computing device may a stand-alone device independent of the instantiated virtual machines.

The general architecture of the routing functionality depicted in FIG. 5 includes an arrangement of computer hardware and software components that may be used to implement aspects of the present disclosure. As illustrated, the routing functionality includes a processing unit 504, a network interface 506, a computer readable medium drive 508, an input/output device interface 509, all of which may communicate with one another by way of a communication bus. The components of the network routing functionality may be physical hardware components or implemented in a virtualized environment.

The network interface 506 may provide connectivity to one or more networks or computing systems. In one embodiment, the network interface 506 provides connectivity to one or more satellite-based networks and one or more cellular networks. In one embodiment, the network interface 506 also provides connectivity to a Wi-Fi network and/or a Bluetooth connection (or other short-range wireless communication connection). In one embodiment, the network interface 506 also provides connectivity to a wired communication connection (e.g., a LAN). The processing unit 504 may thus receive information and instructions from other computing systems or services via a network. The processing unit 504 may also communicate to and from memory 510 and further provide output information. In some embodiments, the network routing functionality may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the network routing functionality. The memory 510 may further include computer program instructions and other information for implementing aspects of the present disclosure. For example, in one embodiment, the memory 510 includes interface software 512 for receiving and processing information. Memory 510 includes a communications management component 516 for configuring or managing the routing of content as described herein.

Examples of Antenna Embodiments

The techniques described above may be used with flat panel satellite antennas. Embodiments of such flat panel antennas are disclosed. The flat panel antennas include one or more arrays of antenna elements on an antenna aperture. In one embodiment, the antenna aperture is a metasurface antenna aperture, such as, for example, the antenna apertures described below. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system, or an antenna having a metasurface as described herein. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology (e.g., antenna elements) to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
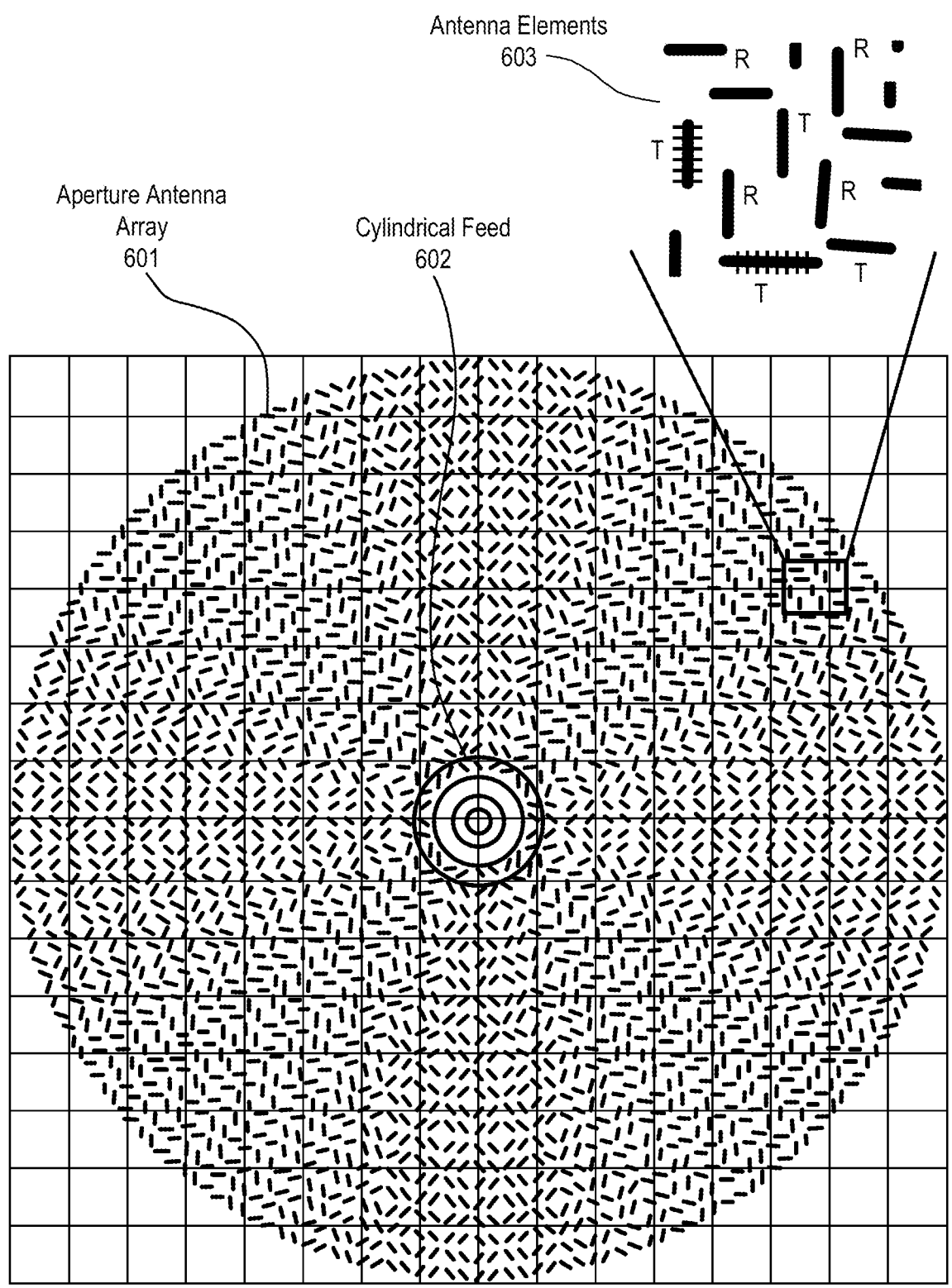
FIG. 6 illustrates the schematic of one embodiment of a cylindrically fed holographic radial aperture antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LU" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal.

Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure (of surface scattering antenna elements such as described herein), while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
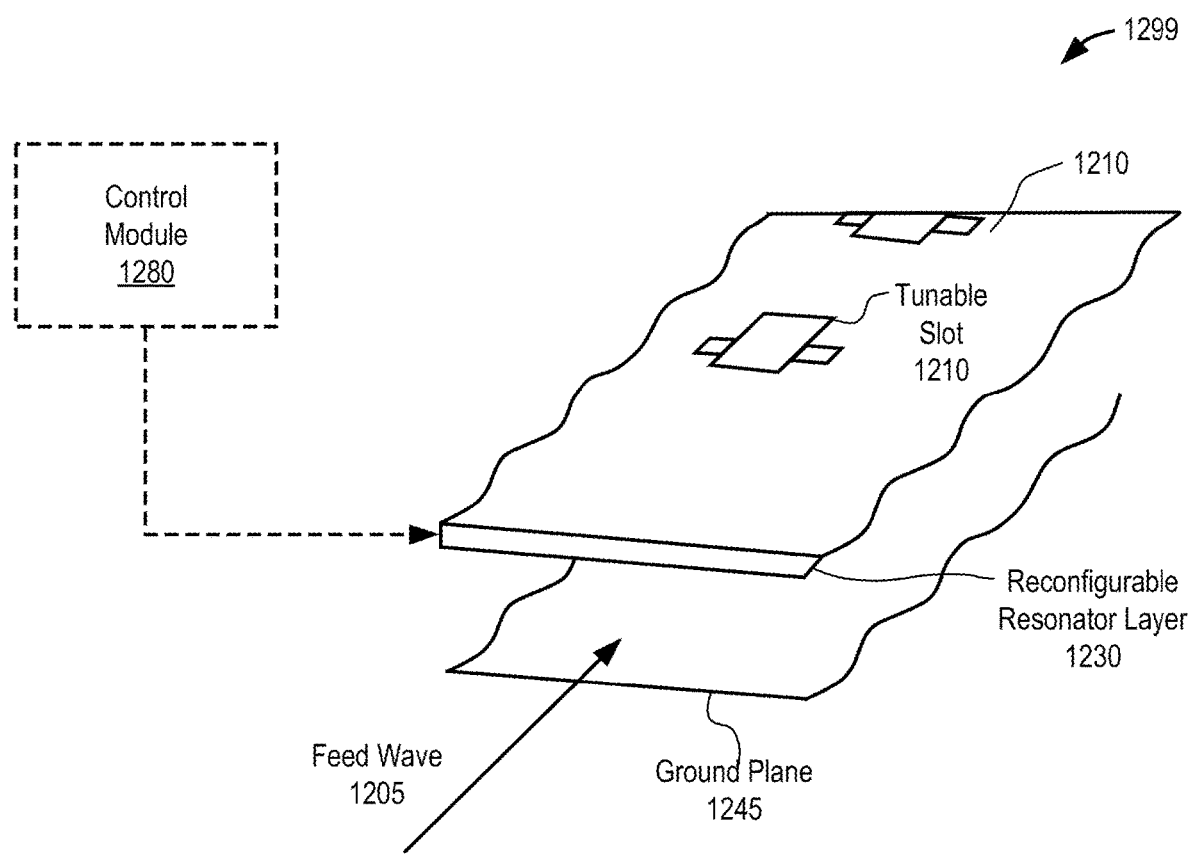
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
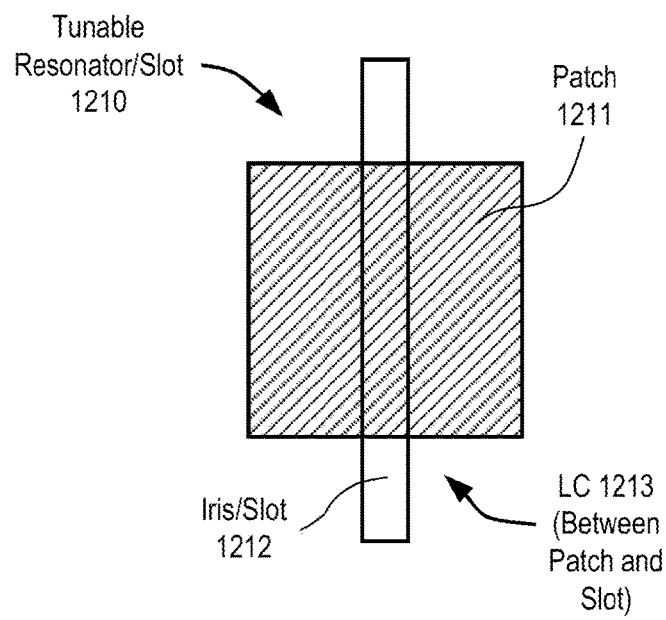
FIG. 8A illustrates one embodiment of a tunable resonator/slot.

Control module, or controller, 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}*w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
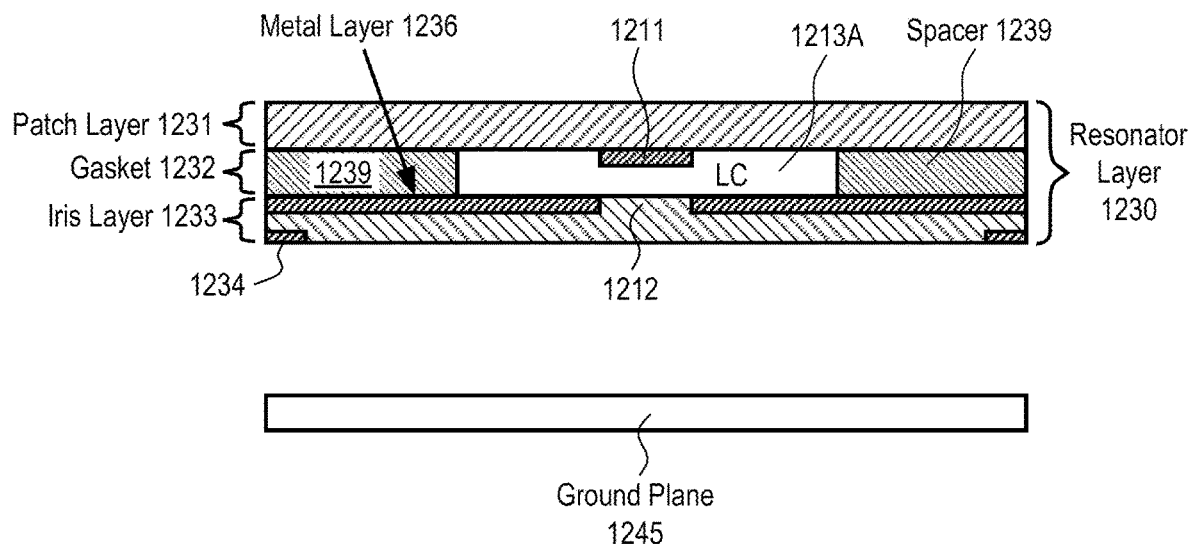
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 8A, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 6. Note that in this example the antenna array has two different types of antenna elements that are used for two different types of frequency bands.

Figure 9A:
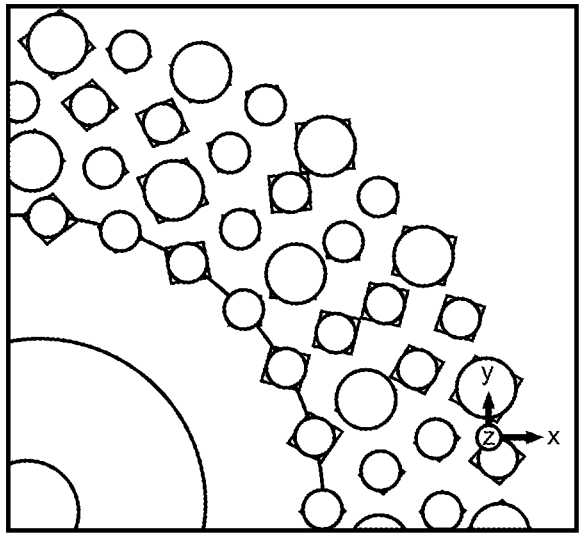
FIGS. 9A-D illustrate one embodiment of the different layers for creating the slotted array.
Figure 9B:
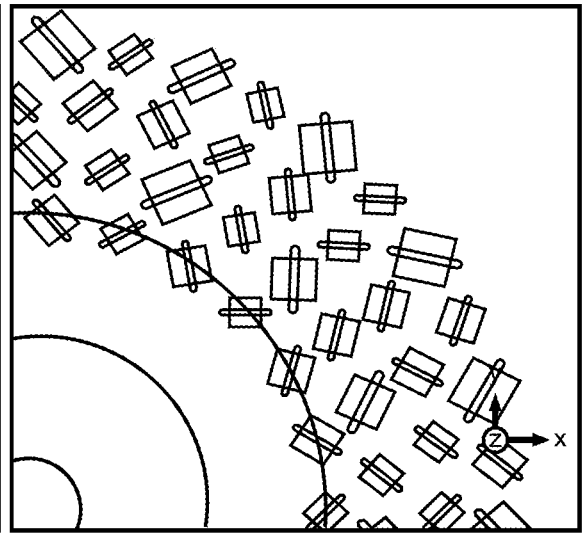
Figure 9C:
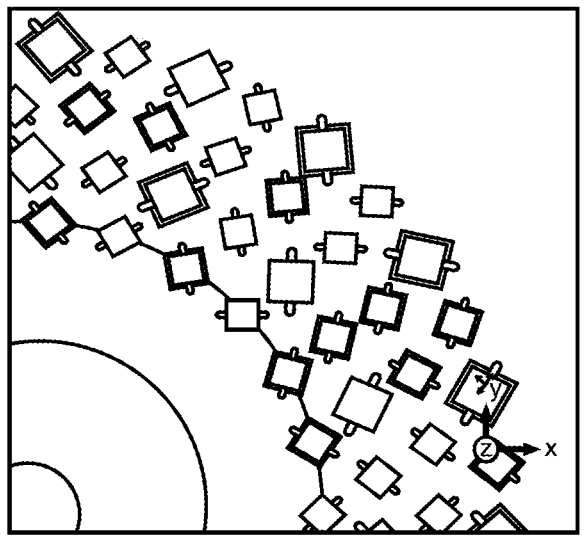
Figure 9D:
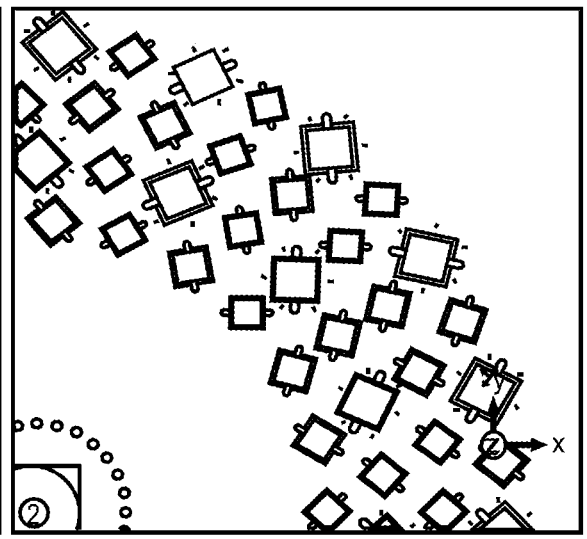

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
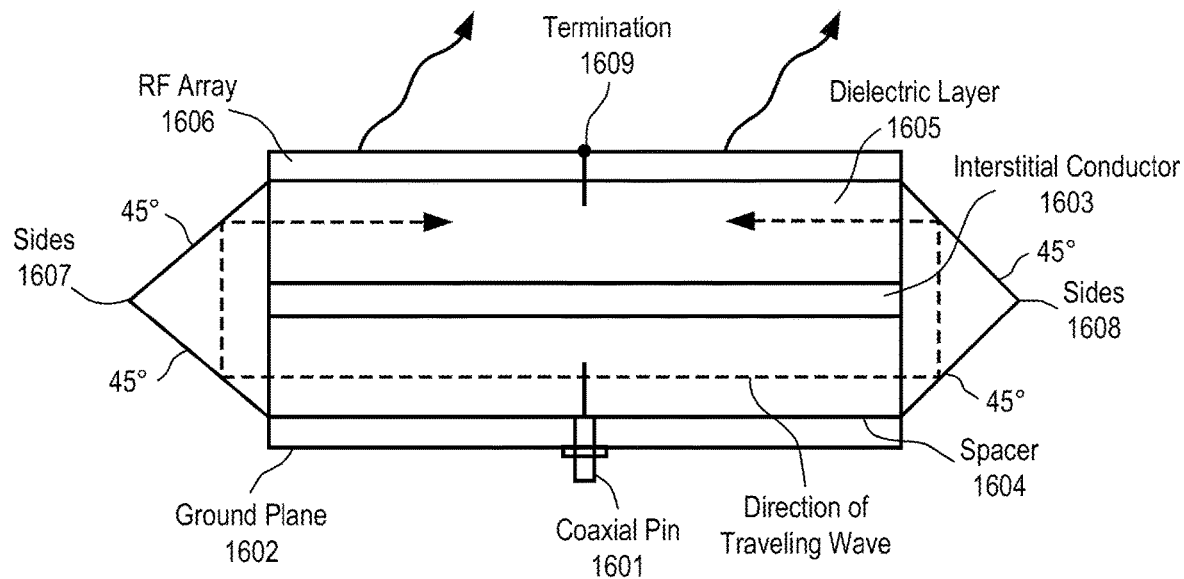
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602. Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 450 angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
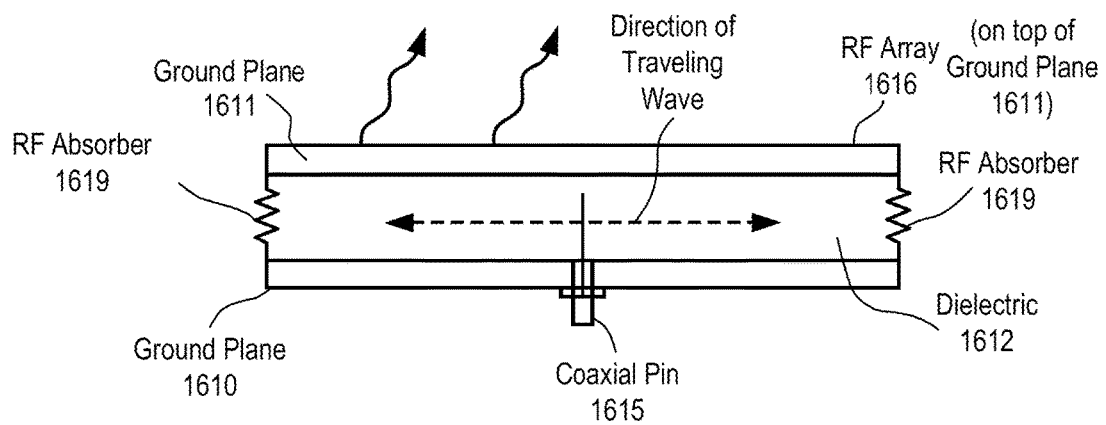
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (e.g., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
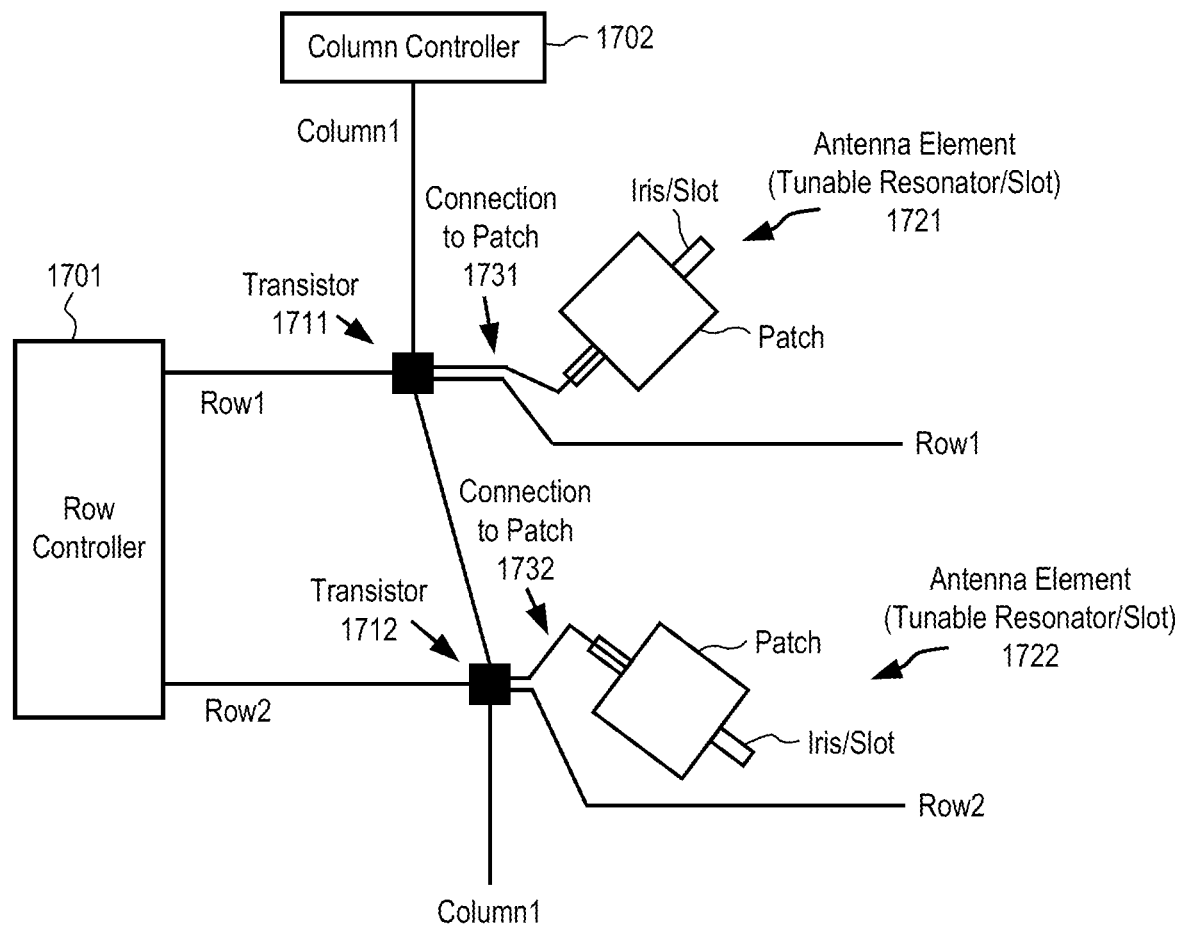
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is pre-defined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
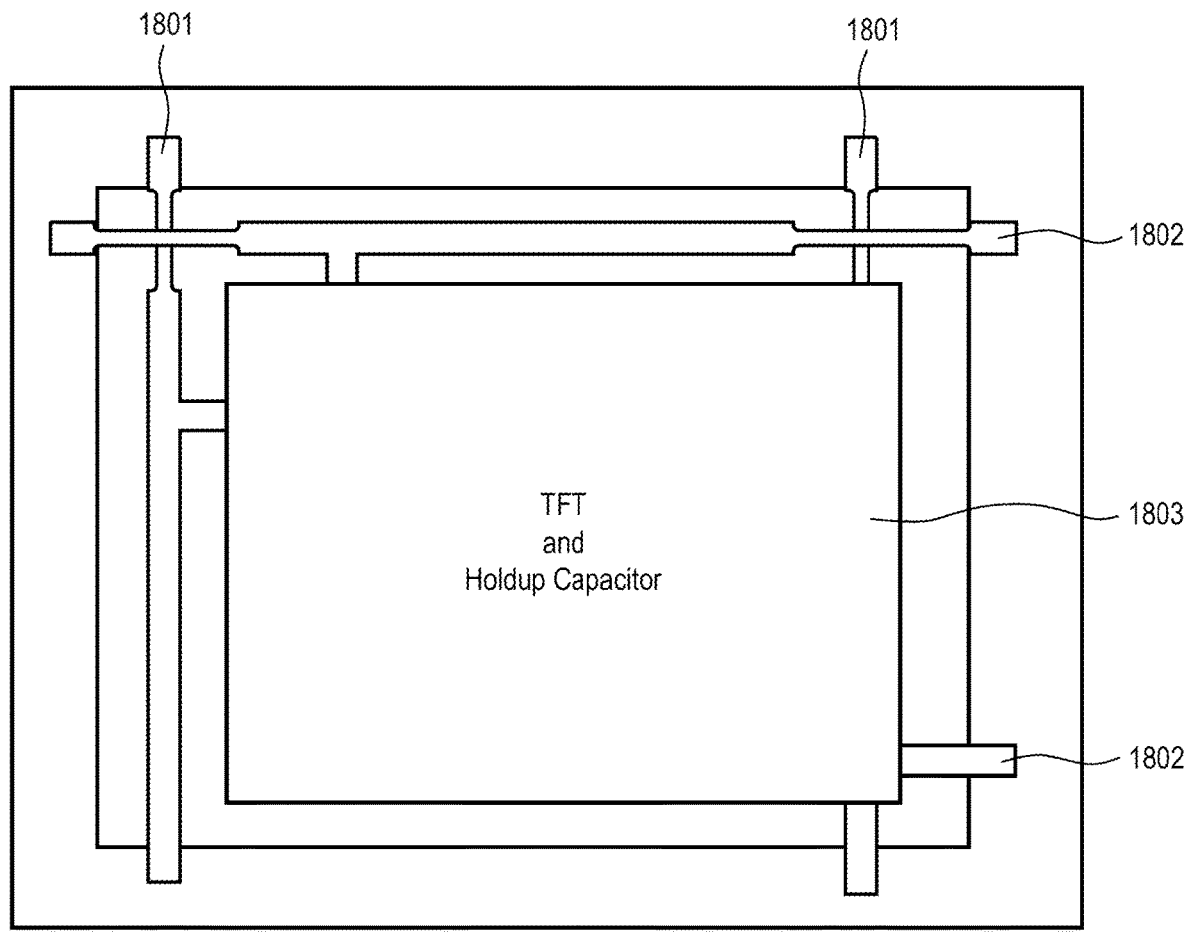
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
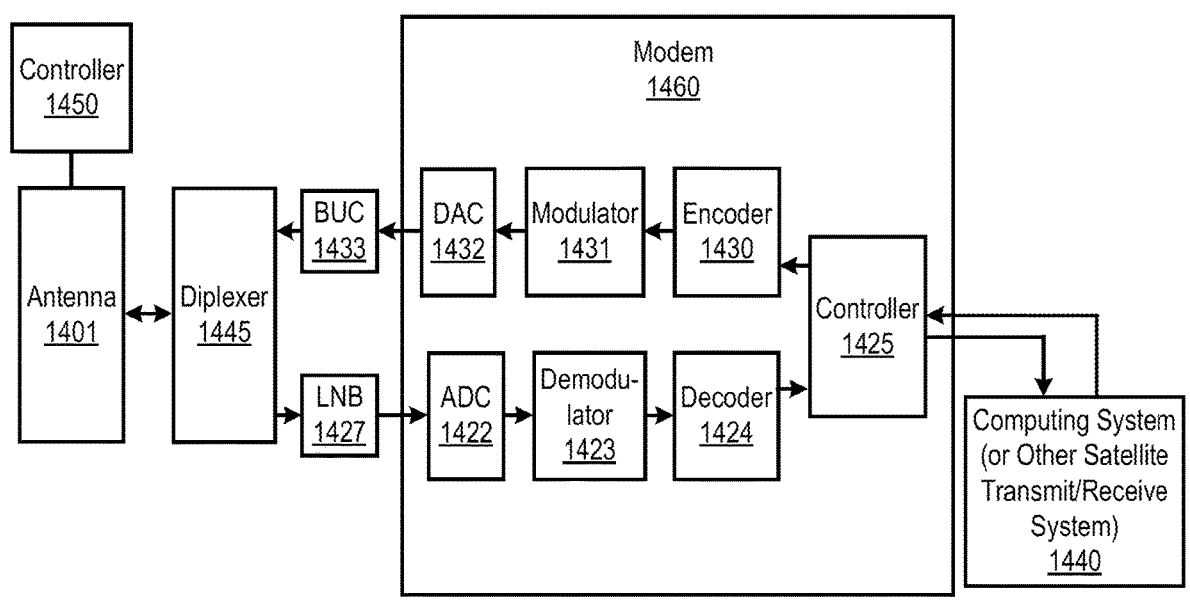
FIG. 14 is a block diagram of one embodiment of a communication system having simultaneous transmit and receive paths.

In another embodiment, the combined antenna apertures are used in a full duplex communication system. FIG. 14 is a block diagram of an embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There are a number of example embodiments described herein.

Example 1 is a communications framework comprising: an edge appliance comprising a satellite modem interconnect for coupling to a satellite modem external to the edge appliance, a cellular modem interconnect for coupling to a cellular modem external to the edge appliance, a switch coupled to the satellite and cellular modem interconnects, and a processing node coupled to the switch and comprising a router to switch traffic between the satellite modem interconnect and the cellular modem interconnect when the edge appliance communicates with a public data network using a satellite link or a terrestrial cellular link, respectively; and a connectivity platform configured for connection to the edge appliance, the connectivity platform comprising a broker/integrator component configured to operate as a broker and an integrator between the edge appliance and both connectivity service providers and business support systems that perform subscription management to enable the edge appliance access to the satellite and terrestrial cellular links.

Example 2 is the communications framework of example 1 that may optionally include that the processing node is configured to switch between use of the satellite and terrestrial cellular links when the edge appliance is mobile to maintain a connection to the data network.

Example 3 is the communications framework of example 1 that may optionally include that the connectivity platform comprises a cloud-based microservices architecture.

Example 4 is the communications framework of example 3 that may optionally include that the microservices architecture provides virtual network functions (VNFs).

Example 5 is the communications framework of example 4 that may optionally include that the VNFs comprise wide area network (WAN) optimization, content management, dynamic routing policies for the edge appliance.

Example 6 is the communications framework of example 3 that may optionally include that the microservices architecture comprises a network management enclave to make routing decisions for the edge appliance based on traffic shaping and steering.

Example 7 is the communications framework of example 6 that may optionally include that the traffic shaping and steering comprises software-defined wide area network (SD-WAN) traffic shaping and steering.

Example 8 is the communications framework of example 6 that may optionally include that the traffic shaping and steering is based on content and data type.

Example 9 is the communications framework of example 6 that may optionally include that the software-defined wide area network (SD-WAN) traffic shaping and steering is operable to identify traffic demand for a type of content and determine whether the to the satellite link or the terrestrial cellular link is to route the type of content.

Example 10 is the communications framework of example 3 that may optionally include that the microservices architecture comprises a plurality of enclaves configured to control the edge appliance via a direct interface to the broker/integrator component, the plurality of enclaves comprising: a network management enclave to provide network management for interfacing the edge appliance to the public data network, including logic to make routing decisions for the edge appliance based on traffic shaping and steering; an application management enclave to provide data management and content management for interfacing the edge appliance to the public data network; and a security management enclave to provide security management for interfacing the edge appliance to the public data network.

Example 11 is the communications framework of example 1 that may optionally include that the router is configured to maintain connection to the public data network by switching traffic between the satellite modem interconnect and the cellular modem interconnect prior to when the edge appliance arrives at a location in response to predicting that a connection to one of either the satellite link or the terrestrial cellular link will not be available when the edge appliance is at the location.

Example 12 is the communications framework of example 1 that may optionally include that the edge appliance further comprises a communication interface for access by a local network.

Example 13 is the communications framework of example 12 that may optionally include that the communication interface comprises a Bluetooth interface, a Wi-Fi interface or a direct Ethernet interface.

Example 14 is the communications framework of example 1 that may optionally include that the edge appliance is communicably connected simultaneously to a satellite link using the satellite modem interconnect and to a terrestrial cellular link using cellular modem interconnect when switching traffic being communicated between the edge appliance and the public data network.

Example 15 is the communications framework of example 1 that may optionally include that the router is configured to switch traffic based on conditions of the satellite link and the terrestrial cellular link.

Example 16 is the communications framework of example 15 that may optionally include that the conditions comprise link performance metrics.

Example 17 is the communications framework of example 1 that may optionally include a terminal having a satellite modem; and an antenna aperture coupled to the satellite modem, wherein the antenna aperture is part of an electronically scanned antenna, a gimballed, parabolic dish antenna, or a software defined antenna.

Example 18 is a communications framework comprising: an edge appliance comprising a satellite modem interconnect for coupling to a satellite modem external to the edge appliance, a cellular modem interconnect for coupling to a cellular modem external to the edge appliance, a switch coupled to the satellite and cellular modem interconnects, and a processing node coupled to the switch and comprising a router to switch traffic between the satellite modem interconnect and the cellular modem interconnect when the edge appliance communicates with a public data network using a satellite link or a terrestrial cellular link, respectively; a connectivity platform configured for connection to the edge appliance, the connectivity platform comprising a broker/integrator component configured to operate as a broker and an integrator between the edge appliance and both connectivity service providers and business support systems that perform subscription management to enable the edge appliance access to the satellite and terrestrial cellular links, and a microservices architecture with a plurality of enclaves configured to control the edge appliance via a direct interface to the broker/integrator component, the plurality of enclaves comprising a network management enclave to provide network management for interfacing the edge appliance to the public data network, including logic to make routing decisions for the edge appliance based on traffic shaping and steering, an application management enclave to provide data management and content management for interfacing the edge appliance to the public data network, and a security management enclave to provide security management for interfacing the edge appliance to the public data network; and a terminal communicably coupled to the edge appliance, the terminal having a satellite modem and an antenna aperture coupled to the satellite modem.

Example 19 is the communications framework of example 18 that may optionally include that the traffic shaping and steering comprises software-defined wide area network (SD-WAN) traffic shaping and steering.

Example 20 is the communications framework of example 18 that may optionally include that the traffic shaping and steering is based on content and data type.

Example 21 is the communications framework of example 18 that may optionally include that the software-defined wide area network (SD-WAN) traffic shaping and steering is operable to identify traffic demand for a type of content and determine whether the to the satellite link or the terrestrial cellular link is to route the type of content.

Example 22 is the communications framework of example 18 that may optionally include that the terminal is coupled to a vehicle.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. A method comprising:
    managing an edge appliance remotely and autonomously using a connectivity platform configured for connection to the edge appliance, wherein the connectivity platform includes a plurality of network functions for wide area network (WAN) content management and dynamic routing policies implementing business-rule driven routing decisions; and
    switching traffic between a satellite modem interconnect and a cellular modem interconnect of an edge appliance when the edge appliance communicates with a public data network using one or both of a satellite link and a terrestrial cellular link, the satellite modem interconnect for coupling to a satellite modem external to the edge appliance and the cellular modem interconnect for communicably coupling to a cellular modem external to the edge appliance, including
        using a router with routing logic to divide up network traffic for routing and route different portions of the network traffic using both the satellite link and the terrestrial link concurrently to send the network traffic.

2. The method of claim 1 wherein using the routing logic to divide up the network traffic and route the different portions includes making content-specific routing decisions and routing the different portions over different ones of the satellite and terrestrial links based on content of different portions.

3. The method of claim 1 wherein using the routing logic to divide up the network traffic and route the different portions includes:
    selecting different ones of ones of the satellite and terrestrial links to route the different portions, wherein selecting is based on one selected from a group consisting of latency tolerance, price, network function, and ability of the data to be divided into different network functions; and
    routing the different portions over different ones of the satellite and terrestrial links based on the selecting.

4. The method of claim 1 further comprising making routing decisions for the edge appliance based on software-defined wide area network (SD-WAN) traffic shaping and steering.

5. The method of claim 4 wherein making routing decisions for the edge appliance comprises the SD-WAN identifying traffic demand for a type of content and determining whether the satellite link or the terrestrial cellular link is to route the type of content.

6. The method of claim 1 wherein using the routing logic to divide up the network traffic and route the different portions includes comprises dividing data content of the network traffic by sessions and routing the data for each of the different sessions over different ones of the satellite and terrestrial links.

7. The method of claim 1 wherein using the routing logic to divide up the network traffic and route the different portions includes dividing the different portions into subpackets and routing each of the subpackets over either the satellite link or the terrestrial link to one destination.

8. The method of claim 7 wherein performing IP packet reassembly by IP bonding.

9. The method of claim 8 wherein the IP bonding uses bonded latency to reassemble packets from groups of subpackets.

10. A communications framework comprising:
    an edge appliance comprising
        a satellite modem interconnect for coupling to a satellite modem external to the edge appliance,
        a cellular modem interconnect for communicably coupling to a cellular modem external to the edge appliance,
        a switch coupled to the satellite and cellular modem interconnects,
        a processing node coupled to the switch and comprising a router to switch traffic between the satellite modem interconnect and the cellular modem interconnect when the edge appliance communicates with a public data network using one or both of a satellite link and a terrestrial cellular link, respectively, wherein the router includes routing logic operable to divide up network traffic for routing and route different portions of the network traffic using both the satellite link and the terrestrial link concurrently to send the network traffic;
    a connectivity platform configured for connection to the edge appliance, the connectivity platform comprising
        a plurality of network functions for wide area network (WAN) content management and dynamic routing policies implementing business-rule driven routing decisions, the dynamic routing policies implementing business-rule driven routing decisions.

11. The communications framework of claim 10 wherein the edge appliance is configured to make content-specific routing decisions in which the routing logic routes the different portions over different ones of the satellite and terrestrial links based on content of different portions.

12. The communications framework of claim 11 wherein the routing logic is operable to divide data content of the network traffic by sessions and routes the data for each of the different sessions over different ones of the satellite and terrestrial links.

13. The communications framework of claim 11 wherein the routing logic is operable to divide data content of the network traffic by sessions and routes the data for each of the different sessions over different ones of the satellite and terrestrial links.

14. The communications framework of claim 10 wherein the routing logic is operable to route the different portions over different ones of the satellite and terrestrial links that the routing logic selects based on one selected from a group consisting of latency tolerance, price, network function, and ability of the data to be divided into different network functions.

15. The communications framework of claim 10 wherein the routing logic is operable to divide up the network traffic into subpackets and routes each of the subpackets over either the satellite link or the terrestrial link to one destination that performs IP packet reassembly.

16. The communications framework of claim 15 wherein the IP packet reassembly is by IP bonding that uses bonded latency to reassemble packets from groups of subpackets.

17. A communications framework comprising:
an edge appliance comprising
a satellite modem interconnect for coupling to a satellite modem external to the edge appliance,
a cellular modem interconnect for communicably coupling to a cellular modem external to the edge appliance,
a switch coupled to the satellite and cellular modem interconnects,
a processing node coupled to the switch and comprising a router to switch traffic between the satellite modem interconnect and the cellular modem interconnect when the edge appliance communicates with a public data network using one or both of a satellite link and a terrestrial cellular link, respectively, wherein the router includes routing logic operable to divide up network traffic for routing and perform data-aware routing to route different portions of the network traffic based on at least one of type of traffic and content, using both the satellite link and the terrestrial link to send the network traffic;
a connectivity platform configured for connection to the edge appliance, the connectivity platform comprising
a plurality of network functions (NFs), including NFs for wide area network content management and dynamic routing policies for managing the edge appliance remotely and autonomously, the dynamic routing policies implementing business-rule driven routing decisions.

18. The communications framework of claim 17 wherein the edge appliance is operable to:
obtain information identifying communication network availability and characteristics of the satellite and terrestrial links;
determine attributes of at least one link defined according to set of criteria; and
make a data-aware routing decision based on characteristics of data to be transmitted and whether the characteristics meets characteristics of communication link used to route the data.

19. The communications framework of claim 18 wherein the router is operable to discover or is configured with parameters of the satellite and terrestrial links.

20. The communications framework of claim 17 wherein the edge application is operable to select a wireless network based on type of data and/or content, including
selecting a wireless communication network that meets needs of instant sharing after determining the data to be transmitted or an application generating the data is characterized by the service provider as requiring instant sharing,
selecting a wireless communication network with a lower latency after determining the data to be transmitted or an application generating the data is characterized as functioning poorly on a higher latency network connection, and
selecting a satellite communication network after determining the data to be transmitted or an application generating the data is characterized as latency tolerant and requiring a predetermined level reliability and dependability or determining a vehicle with the edge appliance is moving and cellular communication is not established.

* * * * *